US 8,808,481 B2

(12) United States Patent
Schröer et al.

(10) Patent No.: US 8,808,481 B2
(45) Date of Patent: Aug. 19, 2014

(54) METHOD FOR THE PRODUCTION OF A WEB

(75) Inventors: Jörn Schröer, Herdecke (DE); Rüdiger Laur, Dortmund (DE); Gilles Schwaab, Dortmund (DE)

(73) Assignee: Ewald Dorken AG, Herdecke (DE)

( * ) Notice: Subject to any disclaimer, the term of this patent is extended or adjusted under 35 U.S.C. 154(b) by 1183 days.

(21) Appl. No.: 11/996,517

(22) PCT Filed: Jul. 25, 2006

(86) PCT No.: PCT/EP2006/007323
§ 371 (c)(1),
(2), (4) Date: Jan. 29, 2008

(87) PCT Pub. No.: WO2007/012463
PCT Pub. Date: Feb. 1, 2007

(65) Prior Publication Data
US 2008/0227350 A1    Sep. 18, 2008

(30) Foreign Application Priority Data
Jul. 25, 2005 (DE) .......................... 10 2005 035 246

(51) Int. Cl.
*B32B 37/02* (2006.01)
(52) U.S. Cl.
USPC ............ 156/182; 156/60; 156/73.5; 156/288; 156/297; 156/299; 156/313; 156/322
(58) Field of Classification Search
CPC .. B32B 37/02; B32B 37/025; B32B 37/1284; B32B 2037/12; B32B 2250/04; B32B 2250/05
USPC .......... 156/60, 150, 290, 291, 295, 73.5, 182, 156/288, 297, 299, 313, 322
See application file for complete search history.

(56) References Cited

U.S. PATENT DOCUMENTS 3,638,381 A    2/1972  Robertson et al.
3,881,447 A *  5/1975  Rebentisch et al. .......... 118/638
(Continued)

FOREIGN PATENT DOCUMENTS

DE    1962640    6/1971
DE    2510162    9/1976
(Continued)

OTHER PUBLICATIONS

"Strip" Dictionary.com Definition, http://dictionary.reference.com/browse/strip, Based on the Random House Dictionary, Random House, Inc. 2011 (no month).*

(Continued)

*Primary Examiner* — Andrew Piziali
(74) *Attorney, Agent, or Firm* — Jason H. Vick; Sheridan Ross, PC

(57) ABSTRACT

Disclosed is a method for producing a web (2) comprising at least one protective layer (11, 11a), at least one functional layer (13), and at least one reinforcement layer (14). The reinforcement layer (14) is provided with greater tear strength than the protective layer (11, 11a) while the reinforcement layer (14) is glued to the functional layer (13) or the protective layer (11, 11a). According to the inventive method, the functional layer (13) is welded together with at least one protective layer (11, 11a) on at least one side by means of heat lamination in order to produce a prelaminate (20), and the obtained prelaminate (20) is then glued to the reinforcement layer (14).

11 Claims, 2 Drawing Sheets

(56) References Cited

U.S. PATENT DOCUMENTS

Figure 1:
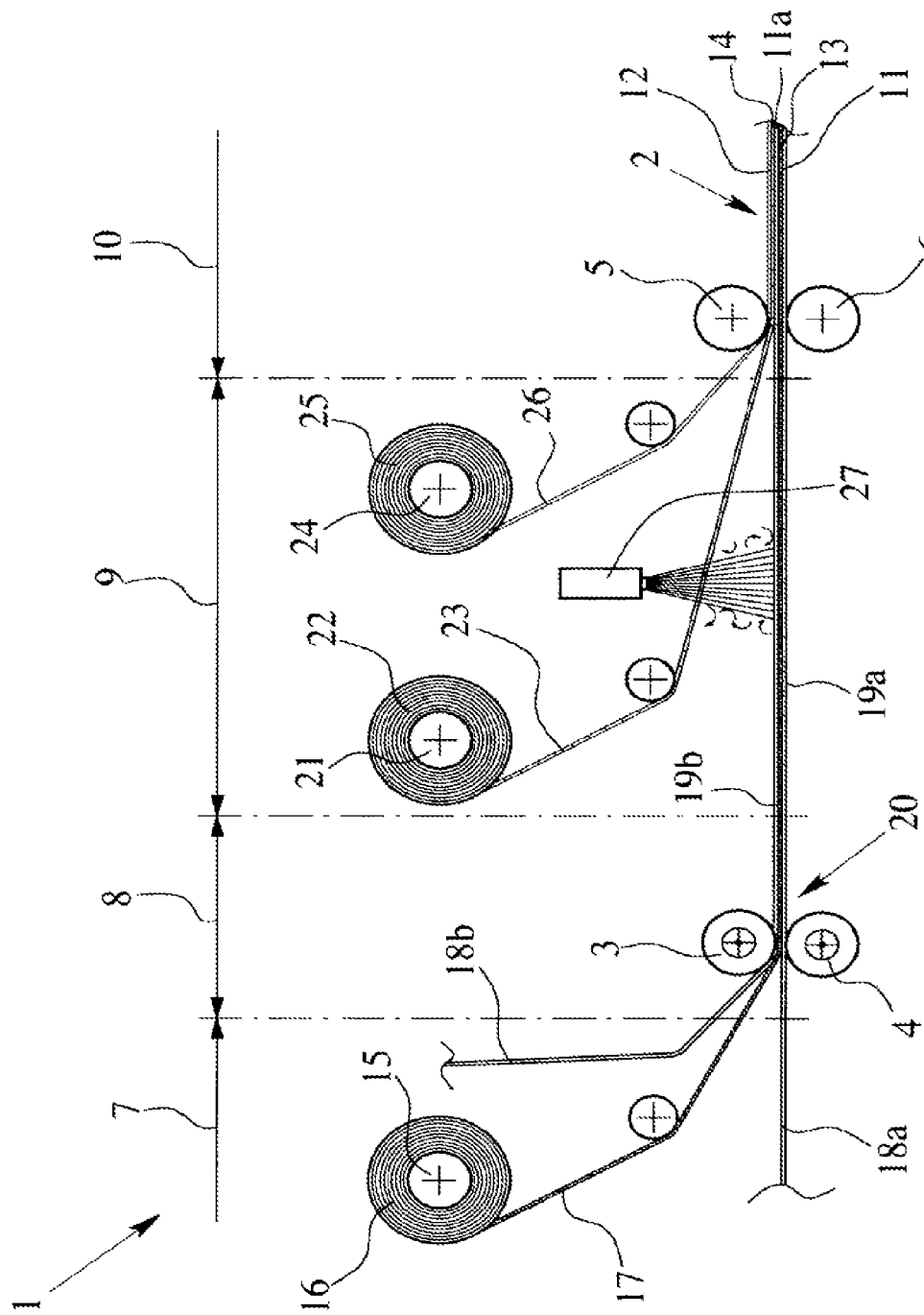

| | | | |
|---|---|---|---|
| 4,495,239 | A | 1/1985 | Pusch et al. |
| 4,511,619 | A | 4/1985 | Kuhnel et al. |
| 4,684,568 | A * | 8/1987 | Lou .................................. 442/76 |
| 4,714,651 | A | 12/1987 | Hartmann et al. |
| 4,762,744 | A * | 8/1988 | Woiceshyn et al. ........... 428/219 |
| 4,911,975 | A | 3/1990 | Schult |
| 4,945,697 | A | 8/1990 | Ott et al. |
| 5,431,343 | A * | 7/1995 | Kubiak et al. .................. 239/105 |
| 5,489,462 | A | 2/1996 | Sieber |
| 5,508,093 | A | 4/1996 | Mehdorn |
| 5,612,114 | A | 3/1997 | Zalewski et al. |
| 5,775,039 | A | 7/1998 | McPherson |
| 5,860,259 | A | 1/1999 | Laska |
| 5,972,810 | A * | 10/1999 | Gabrisch et al. ............... 442/117 |
| 6,672,016 | B2 | 1/2004 | Janesky |
| 6,925,766 | B2 * | 8/2005 | Di Pede .......................... 52/408 |
| 2002/0020142 | A1 | 2/2002 | Swiszcz et al. |
| 2008/0086958 | A1 | 4/2008 | Schroer |
| 2009/0041999 | A1 | 2/2009 | Schroer |
| 2009/0208687 | A1 | 8/2009 | Schroer et al. |

FOREIGN PATENT DOCUMENTS

| | | |
|---|---|---|
| DE | 2947499 | 6/1981 |
| DE | 3302244 | 7/1984 |
| DE | 3432813 | 3/1985 |
| DE | 3342560 | 6/1985 |
| DE | 3150021 | 11/1987 |
| DE | 3843574 | 3/1990 |
| DE | 9405349 | 6/1994 |
| DE | 9404700 | 7/1995 |
| DE | 29602475 | 4/1996 |
| DE | 298 05 622 | 4/1998 |
| DE | 19910420 | 10/1999 |
| DE | 20005974 | 6/2000 |
| DE | 20012227 | 11/2000 |
| DE | 19916772 | 12/2000 |
| DE | 20111595 | 10/2001 |
| DE | 20207877 | 9/2002 |
| DE | 10128078 | 1/2003 |
| DE | 20217044 | 6/2003 |
| DE | 10201152 | 8/2003 |
| DE | 10314764 | 10/2004 |
| EP | 0169308 | 1/1986 |
| EP | 0287078 | 10/1988 |
| EP | 0 570 215 A2 | 11/1993 |
| EP | 1586721 | 10/2005 |
| WO | WO 82/03099 | 9/1982 |
| WO | WO 97/30244 | 8/1997 |

OTHER PUBLICATIONS

International Search Report for International Application No. PCT/EP2006/007323, dated Nov. 20, 2006.

Rouette, H.K., Handbuch Textilveredelung: Technologie, Verfahren und Maschinen, Bank II 14. Aufl. Frankfurt am Main: Deutscher Fachverlag (2003), pp. 848-850.

Giessman, A., Substrat- und Textilbeschichtung: Paxiswissen fur Textil-, Bekleidungs- und Beschichtungsbetriebe, Berlin (u.a.): Springer 2003, pp. 51-53.

International Preliminary Report on Patentability for International (PCT) Patent Application No. PCT/EP2006/007323, issued Feb. 5, 2008.

Official Action for U.S. Appl. No. 11/873,656, mailed Sep. 3, 2009.
Official Action for U.S. Appl. No. 11/873,656, mailed Mar. 30, 2010.
Official Action for U.S. Appl. No. 11/911,994, mailed Aug. 21, 2009.
Official Action for U.S. Appl. No. 11/911,994, mailed Apr. 12, 2010.
Official Action for U.S. Appl. No. 11/873,656, mailed Jan. 7, 2011.

* cited by examiner

METHOD FOR THE PRODUCTION OF A WEB

CROSS REFERENCE TO RELATED APPLICATIONS

This application is a national stage application under 35 U.S.C. 371 of PCT Application No. PCT/EP2006/007323 having an international filing date of 25 Jul. 2006, which designated the United States, which PCT application claimed the benefit of German Application No. 10 2005 035 246.4 filed 25 Jul. 2005, the entire disclosures of each of which are hereby incorporated herein by reference.

The invention relates to methods for the production of a web according to the preamble of claim 1.

Webs of the aforementioned type are used, among other things, in the new construction, restoration, retiling and the subsequent extension of a roof as reinforced or sub-roof formwork webs, as a water and/or vapor and/or air barrier, or as façade webs. The aforementioned webs have at least one so-called functional layer the purpose of which is, for example, to ensure the water-tightness of the web. Moreover, the functional layer can also be designed such that the penetration of liquid water is prevented while at the same time ensuring sufficient vapor permeability to allow moisture to escape from the roof construction. What is more, through an appropriate design of the web, the air exchange rate and the oxygen permeability through the web can be influenced. As a result, it is possible by using the aforementioned webs to reduce energy losses and to improve the living environment under the roof.

The functional layer, as such, generally has a low level of strength and must be protected, on the one hand, against abrasion and against mechanical damage, particularly during the laying of the web, and on the other hand against tearing during the manufacturing process and/or during the subsequent laying of the web. As protection from abrasion, the functional layer is generally affixed to a protective layer, for example a fleece. The fleece here consists of interconnected fibers and/or threads, with the fiber web having fibers and/or threads that can be affixed by thermal, mechanical or chemical means. For example, during the production of nonwoven fleece fabrics that are twisted once together, continuous threads made of a thermoplastic polymer, for example polypropylene, are extruded through spinnerets in order to form a loose gauze which is subsequently solidified by means of heat and pressure in a continuous process into a finished fleece. The thermal bonding of thermoplastic threads can be achieved through uniform application of heat and pressure over the entire area, or through intermittent application of heat and pressure so that only discrete areas of the fabric are bonded. Discrete bonding, which is usually referred to as spot bonding, gives the material a rather textile character in comparison to bonding of the entire surface. Spot bonding is usually achieved using a calender system which comprises at least two heated calender rollers of which one has a level surface and the other a surface with a raised embossing structure, so that the loose textile material made of fibers or threads is welded when passed through the roller gap between the two calender rollers. This method is suitable for thermoplastic polymers, for example polypropylene, polyethylene, polyamide or polyester.

If the functional layer is bonded to a fleece or a woven fabric or the like, damage to the functional layer as a result of abrasion is ruled out for the most part due to the fleece. Nonetheless, tensile forces during the manufacture of the web or during laying even after adhesion of the functional layer to the fleece can cause the thus-produced layered composite to tear. Although it is possible in principle to affix the functional layer to a fleece having a greater layer thickness, this is laborious and leads to higher manufacturing costs.

A more favorable breaking force/cost ratio is offered by woven fabrics or interlaid scrims, e.g. made of filaments or little ribbons, or as a gauze, with the woven fabric or interlaid scrim or gauze being bonded to the functional layer as a reinforcement layer. A layered composite thus emerges comprising the fleece, the functional layer, and the reinforcement layer. The fleece, as a protective layer, ensures protection against abrasion, whereas the reinforcement layer ensures a sufficient tear strength of the layered composite. Here, the reinforcement layer has a greater tear strength than the fleece.

A reinforced web made of plastic is known from EP 0 169 308 A2 which has a polyurethane film, a fleece layer and a gauze, with the gauze being disposed between the polyurethane film and the fleece layer. To produce the known reinforced web, the polyurethane film is applied to one side of a fleece layer during extrusion and positively bonded to same without bonding appliances. During manufacture, the gauze is laid upon the thin fleece layer and the polyurethane film is extruded onto this layer, hence taking on close contact with the fleece layer, and the gauze is held in place by the bonded layers. A disadvantage of the known method is that a very thick functional layer is required in order to prevent leaks.

A reinforced web made of plastic is known from EP 0 169 308 A2 which has a polyurethane film, a fleece layer and a gauze, with the gauze being disposed between the polyurethane film and the fleece layer. To produce the known reinforced web, the polyurethane film is applied to one side of a fleece layer during extrusion and positively bonded to same without bonding appliances. During manufacture, the gauze is laid upon the thin fleece layer and the polyurethane film is extruded onto this layer, hence taking on close contact with the fleece layer, and the gauze is held in place by the bonded layers. A disadvantage of the known method is that a very thick functional layer is required in order to prevent leaks.

The filaments or little ribbons which form the reinforcement layer as woven fabric or interlaid scrim or gauze generally have a greater thickness and a greater titer than the fleece fibers. A bonding of the reinforcement layer with the functional layer through lamination or extrusion can consequently lead to damaging of the filaments or little ribbons or damaging of the functional layer. This can endanger the strength or the functionality of the band.

Moreover, it is known from the prior art to adhere the reinforcement layer to the functional layer. In this context, powder coating methods are used in which an adhesive is dusted on from above through openings in the reinforcement layer onto the functional layer below. Subsequently, the reinforcement layer and the functional layer are adhered together. To achieve adhesion, the reinforcement layer and the functional layer are fed into a roller system but in which the pressing force of the rollers is so slight that the filaments or little ribbons of the reinforcement layer are not damaged and the functional layer is not damaged. It is disadvantageous in the aforedescribed method that the thus-obtained adhesive bonding between the reinforcement layer and the functional layer has little strength. This is particularly significant during laying of the webs, since very strong tear forces can occur during laying. It also occurs frequently that the adhesive bonds do not hold permanently. If the bond comes loose, the sensitive functional layer is no longer protected. Furthermore, in webs which have a plurality of layers, the affixing of the individual layers to each other leads to a commensurately high consumption of adhesive which, due to the high costs of adhesives, contributes to higher manufacturing costs. In addition, appropriate application devices and/or a plurality of process steps are required in order to make the affixing of the layers to each other possible.

It is the object of the present invention to make available a method with which it is possible to produce a web of the type mentioned at the outset simply and with low manufacturing costs, with the thus-produced web having a high level of protection against abrasion, mechanical damage and against tearing of the functional layer.

The aforementioned object is achieved in a first embodiment of the inventive method of the type mentioned at the outset by the features of claim 1.

Here, the invention is based on the fundamental idea of joining the functional layer with the protective layer not through adhesion but rather through thermal lamination, which leads to savings in terms of adhesives and to a simplification of the method of execution. Moreover, a permanent bond between the functional layer and the protective layer is guaranteed. Through thermal lamination, the functional layer is preferably welded to the protective layer in a punctiform manner, but in principle the bonds between the functional layer and the protective layer can also be non-punctiform. The prelaminate itself is adhered to the reinforcement layer so that no damage can come to the reinforcement layer or the functional layer.

The prelaminate prepared through thermal lamination in a calender system ensures lasting protection of the functional layer against abrasion and, moreover, leads to a reinforcement of the functional layer, which has a simplifying effect on the manufacturing process of a web according to the invention. In connection with the invention, the term "web" refers to a laminate composed of several layers of the same or different material, wherein the laminate is intended to have at least one functional layer, at least one reinforcement layer and at least one protective layer.

Preferably, a provision is made that the functional layer is respectively welded on both sides with a protective layer in order to obtain the prelaminate. The functional layer is then embedded between two protective layers, with the reinforcement layer being bonded to a protective layer of the prelaminate. This offers the advantage that the functional layer is better protected against damage from the relatively coarse filaments of the reinforcement layer, particularly at its knot points. In principle, however, a provision can also be made that the functional layer is welded on one side with a protective layer and that the thus-obtained prelaminate is subsequently adhered on the side of the functional layer to the reinforcement layer.

In an especially preferred embodiment of the invention, a provision is made that the thermal lamination is performed inline. In one process step, a fiber gauze having threads or fibers is fastened to a protective layer and joined to the functional layer. Preferably in a single operation, the functional layer can be thermally bonded on both sides to an outer protective layer. As a result, the method for the production of a web according to the invention is further simplified and the manufacturing cost reduced. In principle, it is of course also possible that the fiber gauze first be fastened in a lamination process performed offline and the thus-obtained protective layer(s) is (are) subsequently bonded with the functional layer in a further lamination process or welded in selected areas.

All of the following explanations can relate to a web in which a prelaminate is adhered to the reinforcement layer, with the prelaminate having a functional layer that is bonded on at least one or both sides to a protective layer. Here, the reinforcement layer can be adhered to the functional layer (with coating on one side) or to a protective layer (with coating on both sides of the functional layer).

After adhesion to the prelaminate, the reinforcement layer can be adhered to a further layer, preferably another protective layer. In order to simplify the method, a provision is preferably made here that the prelaminate is adhered in one process step to the reinforcement layer and the reinforcement layer to the further layer.

In an alternative embodiment of a method of the type mentioned at the outset, a provision is made to achieve the aforementioned object that an adhesive is applied to the functional layer or the protective layer and/or to the reinforcement layer in such a manner that, during the subsequent bonding of the reinforcement layer to the functional layer or the protective layer, common contact surfaces of the bonded layers are adhered to each other substantially over their entire surfaces.

Here, the invention is based on the fundamental idea of adhering the reinforcement layer on the side of the functional layer or the protective layer as completely as possible to the functional layer or the protective layer. Functional and protective layer(s) can have been bonded previously to a prelaminate, in particular through thermal lamination. What matters here is that the adhesive be applied at least onto the areas of the surface of the respective layer(s) that come into contact with each other after bonding of the layers. Through the method according to the invention, a very good adhesion between the adhered layers can be ensured that is homogeneous over the entire surface, which contributes to a high strength of the web according to the invention. In this connection, a provision is made in principle to minimize the amount of applied adhesive to a great extent, which leads to lower consumption of adhesive and hence to lower manufacturing costs. Nonetheless, it is essential that the adhesive be applied in sufficient quantity and with a sufficient distribution in order to enable the adhesion of the layers substantially at all points of contact.

In another preferred embodiment of the invention, a provision is made that the adhesive is sprayed on or sprinkled on or swirled on in such a manner that a substantially full-surface application of the adhesive on the contact surfaces of the functional layer or the protective layer and/or the contact surfaces of the reinforcement layer results. In order to ensure the swirling of the adhesive, a vortex flow is produced in the area of the reinforcement layer and/or the functional layer or the protective layer, which leads to a distribution of the adhesive over the contact surfaces.

In an alternative embodiment of the invention, a provision can also be made that the adhesive is sprayed on or sprinkled on and the functional layer or the protective layer and/or the reinforcement layer is electrostatically charged such that a substantially full-surface application of the adhesive onto the contact surface is produced. In the latter-mentioned form of embodiment, it is not necessary to produce a vortex flow in order to swirl the adhesive. The adhering of adhesive particles or adhesive threads in the area of the contact surfaces is ensured by the electrostatic charge. In principle, however, a substantially full-surface adhesion of the common contact surfaces is also possible in that the adhesive is applied by brushing onto the layer(s) or that the layer, particularly the reinforcement layer, is dipped into the adhesive.

In an especially preferred embodiment of the invention, a provision is made that the adhesive is applied through openings in the reinforcement layer onto the functional layer or the protective layer and/or onto the side of the reinforcement layer facing the aforementioned layers. Granted, it is also provided in the prior-art methods for powder-coating to apply adhesive through openings in the reinforcement layer onto the functional layer and to then adhere same to another outer layer via the free areas of the reinforcement layer, with the reinforcement layer being fixed between the functional layer and the further layer. However, in the known methods, the adhesive is applied in such a manner that no adhesive is located on the functional layer below the closed areas of the reinforcement layer. The common contact surfaces of the reinforcement layer and the functional layer therefore do not adhere directly together, which has as a consequence that the layered composite of functional layer, reinforcement layer and another outer layer does not have maximum strength.

By contrast, the invention is based on the fundamental idea of applying the adhesive through the openings in the reinforcement layer onto the functional layer or the protective layer and/or onto the reinforcement layer in such a manner that an adhesion of the non-open areas of the reinforcement layer to the functional layer or the protective layer is ensured. Here, the adhesive can be sprayed on or sprinkled on and swirled on such that it hits between and under the filaments or little ribbons of the reinforcement layer. It is thus possible to achieve a very good adhesion between the layers to be adhered that is homogeneous over the entire surface. However, it is also permitted according to the invention as needed that the adhesive be introduced and applied from the side into the area between the reinforcement layer and the functional layer or the protective layer, and not through openings in the reinforcement layer. In that case, the idea is that the adhesive be applied substantially over the entire surface at least on one of the common contact surfaces.

The side of the reinforcement layer facing away from the functional layer can be adhered to at least one further layer, preferably another protective layer, hence forming a four- or five-layer composite. In an embodiment of the method according to the invention achieving substantially the same result, a provision can be made that an adhesive is applied onto the further layer and/or onto the side of the reinforcement layer facing the further layer and the reinforcement layer is subsequently first adhered to the further layer. According to the invention, the adhesive is applied here such that a substantially full-surface adhesion of the common contact surfaces is produced during the subsequent bonding of the reinforcement layer with the further layer. Subsequently, the thus-obtained layered composite can be adhered to the functional layer or the protective layer or the prelaminate.

To simplify the method for the production of a web according to the invention, a provision can be made that the adhesive is applied in one process step, i.e. simultaneously, to both sides of the reinforcement layer. Through the application of the adhesive to both sides, it is possible to adhere the reinforcement layer both to the functional layer or protective layer and to the additional layer by way of common contact surfaces substantially over the entire surface, which results in a high level of adhesion between the layers. In principle, it is of course also possible that the further layer be adhered through the openings in the reinforcement layer to the functional layer or the protective layer without providing for both-sided adhesive layering of the reinforcement layer. The flat bond existing here within the openings of the reinforcement layer between the functional layer or the protective layer and the additional layer contributes to a high level of adhesion between the layers to be adhered.

For further simplification, a provision can be made that the reinforcement layer is adhered in one process step or simultaneously to the functional layer or the protective layer and the additional layer. In principle, it is of course also possible that the reinforcement layer be adhered in subsequent process steps first to the functional layer or the protective layer and then to the additional layer.

The adhesive is preferably applied such that a breathable web is produced. Here, it is essentially a matter of leaving microscopically small areas free that facilitate the diffusion of water vapor or even of oxygen through the web.

The web according to the invention can have a prelaminate which is formed from the functional layer and at least one protective layer, preferably a functional layer that is bonded respectively on both sides to a protective layer, with it being possible for the functional layer to be bonded to the protective layer or protective layers through thermal lamination. Moreover, in the web according to the invention, common contact surfaces of the reinforcement layer and the prelaminate are preferably adhered together substantially over their entire surfaces. The same can apply to a further layer of the web, particularly a further protective layer, which can be adhered on the outside to the reinforcement layer. Here, too, a provision can be made according to the invention that common contact surfaces of the reinforcement layer and the further layer are adhered to each other substantially over their entire surfaces.

The protective layer can be a fleece or a woven fabric or a microfiber layer. The functional layer is preferably water-tight. The water column that can rest on the functional layer before liquid water passes through is at least 200 mm, according to the invention. Moreover, the functional layer can be permeable to water vapor and, preferably, the water vapor permeability of the functional layer can be at least $80 \, g/m^2*24 \, h$. Furthermore, it is also possible in principle that the water vapor permeability of the functional layer be dependent on the ambient humidity or that the functional layer be vapor-retardant. In this case, the functional layer is fully water-tight, so that essentially no water vapor is able to pass through.

The reinforcement layer can be a preferably open woven fabric or interlaid scrim, particularly of mono- or multifilaments or ribbon-shaped strips. A preferably extruded gauze can also be provided as a reinforcement layer. The reinforcement layer can have openings with a cross-sectional surface of at least $1 \, mm^2$, preferably of at least $3 \, mm^2$, in order to make possible the application of adhesive through the openings of the reinforcement layer onto the functional layer and/or onto an additional layer. The surface ratio of open surfaces to closed surfaces of the reinforcement layer can be 1:1.

In principle, it is of course also possible that the surface proportion of the open areas of the reinforcement layer to the entire surface of the reinforcement layer be greater than the surface proportion of the closed surfaces. The reinforcement layer can have a tear strength of at least 150 N/5 cm and, preferably, the ratio of the tear strength of the protective layer to the tear strength of the reinforcement layer can be at least 1:1.5, particularly at least 1:2. In this connection, a provision is preferably made according to the invention that the ratio of the titer of filaments of the protective layer to the titer of filaments of the reinforcement layer can be at least 1:10, preferably 1:20, particularly 1:50.

In principle, the ventilation of a roof is increasingly important. Preferably, a provision is made in this respect that the web according to the invention not only facilitate the diffusion of water vapor but the diffusion of oxygen through the web as well. The oxygen permeability of the web according to the invention can be advantageous in connection with the ventilation of the roof.

According to the invention, the web can have several layers which do not substantially impair the permeability of the web according to the invention. Moreover, it is possible that a radiation protection layer be provided as a further layer, for example a vacuum coating with a metal which can be arranged on the top side of a protective layer for reflecting infrared radiation and/or to shield from electromagnetic radiation. The previously described embodiment of a web according to the invention can further completely prevent the passing of air and/or vapor through the web. Finally, the web according to the invention can have stabilizers, flame retardants or colorants.

To simplify the laying of the web according to the invention, the web can have an adhesive layer over its entire surface or in areas, particularly at the edges. This can be an applied adhesive or a strip which has a self-adhesive layer on both sides as an adhesive layer and can be additionally covered on its back side by a common protective strip. The adhesive layer can be provided on one or on both sides of the outer sides of the web.

In detail, there are a great number of possibilities for embellishment and modification of a method according to the invention for the production of a web, and of a web as such. We refer here to the dependent claims on the one hand and, on the other, to the following detailed description of preferred sample embodiments of the invention with reference to the drawing. In the drawing, FIG. 1 shows a schematic representation of a calendering apparatus for the inline manufacture of a web with two outer protective layers and an inner protective layer, an inner functional layer and an inner reinforcement layer, and FIG. 2 shows a schematic cross-sectional view of a section of a five-layer web having two outer protective layers, an inner protective layer, a functional layer and a reinforcement layer.

Figure 2:
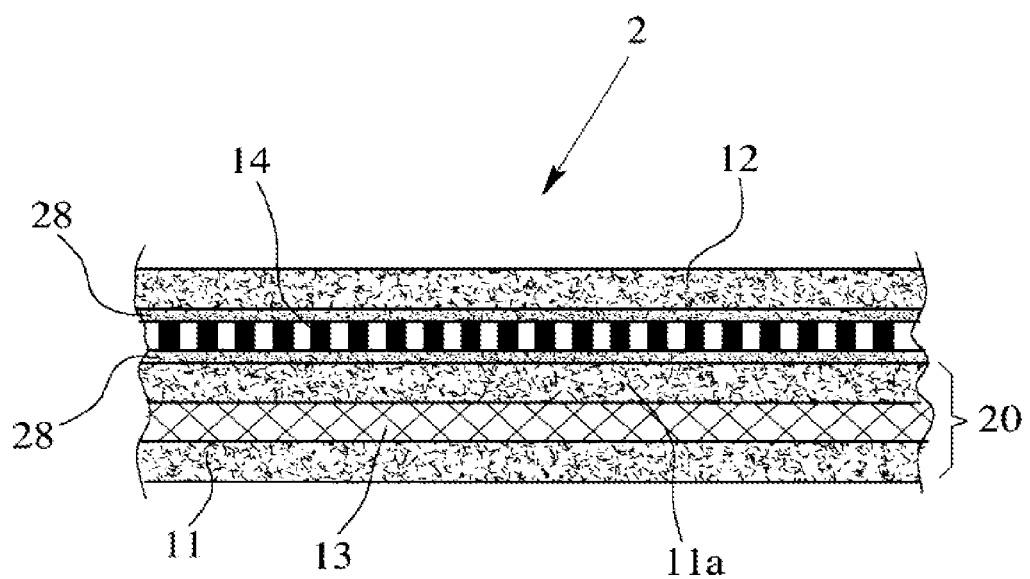

Depicted in FIG. 1 is a calendering apparatus 1 for the production of a web 2 according to the invention. The calendering apparatus 1 has heated calender rollers 3, 4 and preferably non-heated pressure rollers 5, 6 and comprises four sections 7 to 10. In the following, an embodiment of a method according to the invention for the production of a five-layer web 2 which has two outer protective layers 11, 12, an inner protective layer 11a, a functional layer 13 and a reinforcement layer 14 is described in further detail.

The first section 7 comprises a first roll mount 15 which bears a roll 16 of a film 17. The film 17 corresponds to the functional layer 13 in the web 2. Through the film 17, it is ensured that the web 2 has a specified functionality. For example, the film 17 can be a material that is impermeable to liquid water but that is preferably permeable to water vapor and oxygen. By using the film 17, it is therefore possible to produce a web 2 which is breathable, with the term "breathable" referring to the tightness of the web 2 vis-à-vis liquid water and the permeability at least to water vapor.

In the first section 7, the film 17 and two webs 18a, 18b made of unbound filaments of a thermoplastic polymer is prepared for a first calendering process shown in section 8. The unbound filaments of the webs 18a, 18b are fed in the section 8 between the calender rollers 3, 4 and respectively affixed to a fleece 19a, 19b. The fleece 19a, 19b can be pre-attached, something for which methods that are inherently known from the prior art can be used.

In the section 8, the film 17 and the webs 18a, 18b are bonded together through inline lamination. Through thermal lamination of the film 17 and the webs 18a, 18b, a three-layer prelaminate 20 is obtained in section 8. A web 2 hence has the film 17 as a functional layer 13 and the fleece 19a as a first outer protective layer 11 and the fleece 19b as an inner protective layer 11a.

The third section 9 comprises a second roll mount 21 for a roll 22 of a preferably open woven fabric or interlaid scrim 23 made of monofilaments or multifilaments or an extruded gauze. Moreover, the third section 9 comprises a third roll mount 24 for a roll 25 of a fleece fabric 26.

According to the invention, a provision is made in the manufacturing method depicted in FIG. 1 that the prelaminate 20 is provided with an application of adhesive on the side of the inner protective layer 11a through vortex flow application. For this purpose, a spraying apparatus 27 is provided in the section 9 which, in the embodiment of the invention shown, sprays adhesive threads onto the prelaminate 20 through openings in the reinforcement layer 23 (not shown in detail). Here, the spraying apparatus 27 is preferably arranged and designed such that a swirling of the adhesive threads occurs in the area between the inner protective layer 11a and the woven fabric or interlaid scrim 23 before entering the section 10. Here, the vortex flow application is provided for such that, as a result of the swirling, adhesive threads are applied at least also in areas of the inner protective layer 11a that are arranged below unopened areas of the woven fabric or interlaid scrim 23. At the same time, a provision is preferably made that, during the vortex flow application, the woven fabric or interlaid scrim 23 is also applied, at least in areas, on the side of the prelaminate 20 with adhesive threads. In addition, adhesive threads are applied to the woven fabric or interlaid scrim 23 from above, i.e. on the outer side. For this purpose, the spraying apparatus 27 can work together with devices (not shown) to produce a vortex flow.

In the section 10, the prelaminate 20 is fed with the woven fabric or interlaid scrim 23 and the fleece fabric 26 through the pressure rollers 5, 6 and glued in one process step, i.e. simultaneously, with the adhesive applied to the prelaminate 20 and the woven fabric or interlaid scrim 23. Here, the adhesion takes place preferably without thermal treatment of the adhesive and/or of the layers to be adhered. A welding of the woven fabric or interlaid scrim 23 to the prelaminate 20 and the fleece fabric 26 is preferably not provided for in order to rule out, to a large extent, damage to the filaments or little ribbons forming the woven fabric or interlaid scrim 23 or of the functional layer. The thus-obtained web 2 has the woven fabric or interlaid scrim 23 as a reinforcement layer 14.

Depicted in FIG. 2 is a section of the web 2 in cross-section. The web 2 has outer protective layers 11, 12, the functional layer 13, the reinforcement layer 14 and an inner protective layer 11a between the reinforcement layer 14 and the functional layer 13. The outer protective layers 11, 12 are essentially provided to protect the functional layer 13 against abrasion. The inner protective layer 11a protects the functional layer 13 against damage from the relatively course filaments of the reinforcement layer 14, particularly at its knot points. By contrast, the reinforcement layer 14 ensures a high level of tear strength of the web 2. Here, the reinforcement layer 14 is respectively adhered to the inner protective layer 11a and the outer protective layer 12 with an adhesive layer 28, and the thickness of the adhesive layer 28 can be much less than is shown in FIG. 2.

As a first outer protective layer 11 and/or as an inner protective layer 11a, a spun-bonded fabric or stacked-fiber fleece or a mostly closed woven fabric obtainable through thermal, chemical or mechanical consolidation. The minimum surface weight of the protective layer 11, 11a is 5 g/m$^2$. Preferably, the first outer protective layer 11 has a surface weight of 15 to 300 g/m$^2$, particularly up to 100 g/m$^2$. To produce the first outer protective layer 11, 11a, a thermoplastic polymer, preferably polypropylene, polyethylene or polyethylene terephthalate, polyester or polyamide, can be used.

In principle, it is of course also possible to use other materials that are able to contribute to the protection of the functional layer 13 and can be bonded in a suitable manner with the functional layer 13. The same material out of which the protective layer 11, 11a is made can be used as the material for the outer additional protective layer 12.

The functional layer 13 can be a mono- or biaxially stretched film or an unstretched film or even a fine-fiber fleece. The surface weight of the functional layer 13 is preferably 15 to 80 g/m². The functional layer 13 can be made of polypropylene, polyethylene, polyester, polyamide or polyurethane.

The reinforcement layer 14 can be a preferably open woven fabric or interlaid scrim made of monofilaments or multifilaments or an extruded gauze. The reinforcement layer 14 can have glass fibers or natural fibers. The reinforcement layer 14 preferably has a surface weight of 5 to 100 g/m². Preferably, the reinforcement layer 14 can be manufactured from a polymer, though other materials can also be used in principle.

The preferred sample embodiments of the invention indicated in the following refer to a web with a four-layer construction.

SAMPLE EXAMPLE 1

The prelaminate 20 has a thermocalendered spun-bonded fabric of polypropylene with a surface weight of 200 g/m² as an outer protective layer 11. Provided as a functional layer 13 is an extruded, monoaxially stretched film of polypropylene and chalk with a surface weight of 40 g/m² that is water-tight (water column>1500 mm) and permeable to water vapor (1240 g/m²*24 h). The outer protective layer 11 and the functional layer 13 are welded through offline thermolamination using two heated rollers into a prelaminate 20 (water column>1500 mm, water vapor permeability 1180 g/m²*24 h). Provided as a reinforcement layer 14 is an open twist weave of polypropylene with a surface weight of 30 g/m². The reinforcement layer 14 is adhered to the prelaminate 20 and the outer protective layer 12 in one operation, with 9 g/m² of an adhesive being sprayed on at 140° C. through vortex flow application. The adhesive contains an amorphous polyalphaolefin. The further protective layer 12 here is a polypropylene fleece with a surface weight of 30 g/m². The thus-obtained web is water-tight (water column>1500 mm) and permeable to water vapor (1075 g/m²*24 h).

SAMPLE EMBODIMENT 2

The outer protective layer 11 is a polypropylene spun-bonded fabric with a surface weight of 50 g/m². A previously manufactured, monoaxially stretched film of polypropylene and chalk with a surface weight of 40 g/m² is used as a functional layer 13. The functional layer 13 is water-tight (water column>1500 mm) and permeable to water vapor (1240 g/m²*24 h). The outer protective layer 11 and the functional layer 13 are welded through inline thermolamination using two heated rollers. The thus-obtained prelaminate 20 is water-tight (water column>1500 mm) and permeable to water vapor (1150 g/m²*24 h). Provided as a reinforcement layer 14 is a polypropylene flat-woven material of polypropylene with a surface weight of 14 g/m² which is adhered to the prelaminate 20 and the further protective layer 12 in one operation. Here, 8 g/m² adhesive is sprayed on at a temperature of 140° C. through vortex flow application. The adhesive contains amorphous polyalphaolefin. The further outer protective layer 12 is a thermally laminated polypropylene fleece with a surface weight of 15 g/m². The web 2 is water-tight (water column>1500 mm) and permeable to water vapor (1060 g/m²*24 h).

SAMPLE EMBODIMENT 3

Provided as an outer protective layer 11 is a polypropylene spun-bonded fabric with a surface weight of 70 g/m². The functional layer 13 is a previously manufactured, biaxially stretched film of polypropylene and chalk with a surface weight of 25 g/m². The film is water-tight (water column>1500 mm) and permeable to water vapor (1450 g/m²*24 h). The outer protective layer 11 and the functional layer 13 are welded to each other through inline thermal lamination using two heated rollers. The thus-obtained prelaminate 20 is water-tight (water column>1500 mm) and permeable to water vapor (1370 g/m²*24 h). Provided as a reinforcement layer 14 is a polypropylene flat-woven material with a surface weight of 14 g/m². The reinforcement layer 14 is adhered to the prelaminate 20 and the further outer protective layer 12 immediately after welding of the outer protective layer 11 and the functional layer 13 to each other. Here, 5 g/m² of cross-bonding adhesive based on an amorphous polyalphaolefin is sprayed at 160° C. through vortex flow application. Provided as a further protective layer 12 is a thermocalendered polypropylene fleece with a surface weight of 30 g/m² that is adhered simultaneously to the three-layer composite of the prelaminate 20 and the reinforcement layer 14. The thus-obtained web 2 is water-tight (water column>1500 mm) and permeable to water vapor (1305 g/m²*24 h).

SAMPLE EMBODIMENT 4

Used as an outer protective layer 11 is a previously manufactured thermocalendered stacked fiber fleece of polypropylene with a surface weight of 40 g/m². The functional layer 13 is a previously manufactured extruded monoaxially stretched film of polypropylene and chalk with a surface weight of 40 g/m². The film is water-tight (water column>1500 mm) and permeable to water vapor (1240 g/m²*24 h). The outer protective layer 11 and the functional layer 13 are welded to each other through offline thermal lamination using ultrasound. The thus-obtained prelaminate 20 is water-tight (water column>1500 mm) and permeable to water vapor (1220 g/m²*24 h). Provided as a reinforcement layer 14 is a polypropylene open twist weave with a surface weight of 30 g/m². The reinforcement layer 14 is adhered to the prelaminate 20 and the further outer protective layer 12 in one operation. Here, 6 g/m² of cross-bonding adhesive based on an amorphous polyalphaolefin is sprayed at 160° C. through vortex flow application. Used as a further protective layer 12 is a needled polypropylene fleece with a surface weight of 90 g/m². The thus-obtained web 2 is water-tight (water column>1500 mm) and permeable to water vapor (1125 g/m²*24 h).

SAMPLE EMBODIMENT 5

Used as an outer protective layer 11 is a polyethylene spun-bonded fabric with a surface weight of 60 g/m². The functional layer 13 is a previously manufactured extruded monoaxially stretched film of polypropylene and chalk with a surface weight of 30 g/m². The film is water-tight (water column>1500 mm) and permeable to water vapor (1730 g/m²*24 h). The outer protective layer 11 and the functional layer 13 are welded to each other through inline thermal lamination using two heated rollers. The thus-obtained prelaminate 20 is water-tight (water column>1500 mm) and permeable to water vapor (1610 g/m²*24 h). Used as a reinforcement layer 14 is a polypropylene interlaid scrim containing monofilaments with a diameter of 0.43 mm. The interlaid scrim has a surface weight of 30 g/m². The reinforcement layer 14 is adhered to the prelaminate 20 and the further outer protective layer 12 in one operation. Here, 10 g/m² of adhesive based on an ethylene vinyl acetate copolymer is sprayed at 130° C. through vortex flow application. Used as a further protective layer 12 is a thermocalendered polyethylene spun-bonded fabric with a surface weight of 30 g/m². The thus-obtained web 2 is water-tight (water column>1500 mm) and permeable to water vapor (1545 g/m²*24 h).

SAMPLE EMBODIMENT 6

Used as an outer protective layer 11 is a previously manufactured water jet-compacted polypropylene spun-bonded fabric with a surface weight of 50 g/m². The functional layer 13 is a previously manufactured extruded monoaxially stretched film of polypropylene and chalk with a surface weight of 50 g/m². The film is water-tight (water column>1500 mm) and permeable to water vapor (365 g/m²*24 h). The outer protective layer 11 and the functional layer 13 are welded through offline thermal lamination using ultrasound. The thus-obtained prelaminate 20 is water-tight (water column>1500 mm) and permeable to water vapor (315 g/m²*24 h). Provided as a reinforcement layer 14 is a polyester interlaid scrim of monofilaments with a surface weight of 55 g/m². The reinforcement layer 14 is adhered to the prelaminate 20 and the further outer protective layer 12 in one operation. Here, 6 g/m² of adhesive based on an ethylene vinyl acetate copolymer is sprayed using a powder strewing method during which the layers are electrostatically charged. Used as a further protective layer 12 is a water jet-compacted polypropylene spun-bonded fabric with a surface weight of 50 g/m². The thus-obtained web 2 is water-tight (water column>1500 mm) and permeable to water vapor (1125 g/m²*24 h).

In addition, as needed, the invention permits the features disclosed and described in the claims and/or based on the drawing and/or the sample embodiments to be combined with each other, even if this is not described in detail. However, the invention is not limited to the depicted and described embodiments and examples. The values and the intervals indicated in the foregoing respectively comprise all of the values, i.e. not just the lower limits and, in the case of intervals, not just the interval limits, without need for express mention.

The invention claimed is:

1. A method for the production of a web having at least one protective layer, at least one functional layer and at least one reinforcement layer having open areas, the method comprising of:

providing, from a supply roller, a film and least one protective layer which is a web;

forming the at least one functional layer as a continuous sheet by welding by heated rollers the at least one protective layer to the film through thermal lamination, the at least one functional layer being a prelaminate;

conveying the prelaminate to a reinforcement layer application step;

providing a reinforcement layer as a continuous sheet from a roller, wherein the reinforcement layer has a greater tear strength than the at least one protective layer;

applying to the reinforcement layer and the prelaminate an adhesive subsequent to the forming of the prelaminate;

subsequent to applying to the reinforcement layer the adhesive, conveying the reinforcement layer;

providing, from a roller, an outer protective layer as a continuous sheet; and adhering, by pressure rollers, the reinforcement layer to the prelaminate and the outer protective layer to the reinforcement layer.

2. Method as set forth in claim 1, wherein the functional layer is welded on one side to the protective layer and that the thus-obtained prelaminate is subsequently adhered on the side of the functional layer to the reinforcement layer.

3. Method as set forth in claim 1, wherein the thermal lamination is performed inline.

4. Method as set forth in claim 1, wherein the reinforcement layer is adhered to the functional layer, wherein an adhesive is applied in such a manner to the functional layer and/or to the reinforcement layer that, during the subsequent bonding of the reinforcement layer to the functional layer, common contact surfaces of the bonded layer are adhered to each other substantially over their entire surfaces.

5. Method as set forth in claim 4, wherein the adhesive is sprayed on or sprinkled on in such a manner and swirled in such a manner that a substantially full-surface application of the adhesive on the contact surfaces of the functional layer and/or the reinforcement layer results.

6. Method as set forth in claim 4, wherein the adhesive is sprayed on or sprinkled on and the functional layer and/or the reinforcement layer are electrostatically charged such that a substantially full-surface application of the adhesive on the contact surfaces results.

7. Method as set forth in claim 4, wherein the adhesive is applied through openings in the reinforcement layer onto the functional layer and/or on the reinforcement layer.

8. Method as set forth in claim 4, wherein contact surfaces of the reinforcement layer and the further layer are adhered to each other substantially over their entire surfaces.

9. Method as set forth in claim 4, wherein in a single operation the adhesive is applied to both layer sides of the reinforcement layer.

10. Method as set forth in claim 4, wherein the reinforcement layer is adhered in one operation to the functional layer and a further layer.

11. Method as set forth in claim 4, wherein the adhesive is applied such that a non-vapor-retardant web is produced.

* * * * *